US009506222B2

(12) United States Patent
Britten et al.

(10) Patent No.: US 9,506,222 B2
(45) Date of Patent: Nov. 29, 2016

(54) DRIVE CONTROL METHOD AND SYSTEM FOR OPERATING A HYDRAULIC DRIVEN WORK MACHINE

(75) Inventors: Judith Britten, Völklingen (DE); Daniel Müller, Newel (DE); Thomas Schaefer, Trier (DE); Bernd Faber, Konz (DE)

(73) Assignee: Volvo Construction Equipment AB, Eskilstuna (SE)

( * ) Notice: Subject to any disclaimer, the term of this patent is extended or adjusted under 35 U.S.C. 154(b) by 324 days.

(21) Appl. No.: 14/239,553

(22) PCT Filed: Aug. 26, 2011

(86) PCT No.: PCT/SE2011/000156
§ 371 (c)(1),
(2), (4) Date: Feb. 19, 2014

(87) PCT Pub. No.: WO2013/032370
PCT Pub. Date: Mar. 7, 2013

(65) Prior Publication Data
US 2014/0190153 A1    Jul. 10, 2014

(51) Int. Cl.
*E02F 9/22*  (2006.01)
*F16H 61/421*  (2010.01)
(Continued)

(52) U.S. Cl.
CPC ........... *E02F 9/2228* (2013.01); *E02F 9/2246* (2013.01); *E02F 9/2253* (2013.01); *E02F 9/2278* (2013.01); *E02F 9/2285* (2013.01); *E02F 9/2296* (2013.01); *F16H 61/421* (2013.01); *F16H 61/433* (2013.01); *F16H 61/478* (2013.01); *F16H 61/47* (2013.01); *F16H 2059/465* (2013.01)

(58) Field of Classification Search
CPC ............................ F16H 61/421; F16H 61/433
USPC .................................................. 60/445, 452
See application file for complete search history.

(56) References Cited

U.S. PATENT DOCUMENTS 4,487,109 A    12/1984  Burandt et al.
4,627,329 A    12/1986  Durtschi
(Continued)

FOREIGN PATENT DOCUMENTS

DE    4303240 A1    8/1994
EP    0407618 A1    1/1991
(Continued)

OTHER PUBLICATIONS

Japanese Official Action (Feb. 12, 2015) (translation) for corresponding Japanese App. 2014-527113.
(Continued)

*Primary Examiner* — Thomas E Lazo
(74) *Attorney, Agent, or Firm* — WRB-IP LLP

(57) ABSTRACT

A system and a method for operating a hydraulic driven work machine including a hydraulic travel motor having a variable displacement is provided, wherein a flow of hydraulic fluid generated by a hydraulic pump is provided to the travel motor and wherein a control valve is provided for controlling the flow of hydraulic fluid from the hydraulic pump to the travel motor. The hydraulic pump is provided with a hydraulic control depending on a load signal generated by the travel control valve and the travel motor is provided with an electric control according to a desired driving behavior.

19 Claims, 10 Drawing Sheets

(51) Int. Cl.
  *F16H 61/433* (2010.01)
  *F16H 61/478* (2010.01)
  *F16H 61/47* (2010.01)
  *F16H 59/46* (2006.01)

(56) References Cited

U.S. PATENT DOCUMENTS

| | | | |
|---|---|---|---|
| 5,331,812 A * | 7/1994 | Imai | E02F 9/2253 60/450 |
| 5,775,453 A | 7/1998 | Williams et al. | |
| 5,784,883 A | 7/1998 | Ohkura et al. | |
| 6,321,867 B1 | 11/2001 | Kowalyk | |
| 8,393,150 B2 * | 3/2013 | Brickner | E02F 9/2235 60/443 |
| 2003/0205044 A1 | 11/2003 | Franz | |

FOREIGN PATENT DOCUMENTS

| | | |
|---|---|---|
| EP | 1835205 A1 | 9/2007 |
| EP | 2123847 A1 | 11/2009 |
| JP | 2011163048 | 8/2011 |
| WO | 9008910 | 8/1990 |
| WO | 2010025133 A2 | 3/2010 |

OTHER PUBLICATIONS

International Search Report (May 23, 2012) for corresponding International Application PCT/SE2011/000156.
International Preliminary Report on Patentability (Dec. 4, 2013) for corresponding International Application PCT/SE2011/000156.
Supplementary European Search Report (Jun. 10, 2016) for corresponding European App. 11 87 1724.

* cited by examiner

Fig. 2a

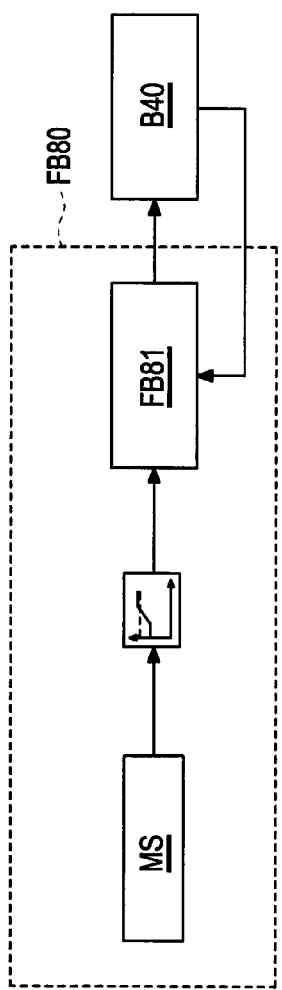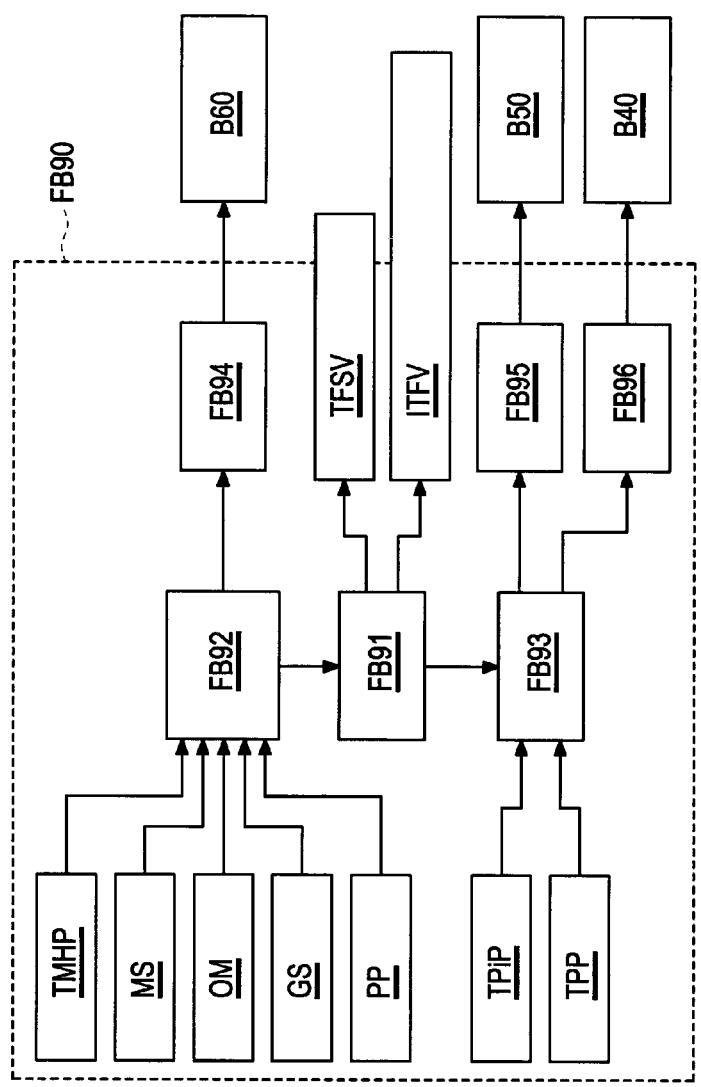

DRIVE CONTROL METHOD AND SYSTEM FOR OPERATING A HYDRAULIC DRIVEN WORK MACHINE

BACKGROUND AND SUMMARY

The invention relates to a hydraulic drive control in e.g. construction machines.

EP 2123 947 A1 discloses a travel control system for a construction machine with a hydraulic open centre hydraulic travel system, where the displacement of a variable-displacement travel motor is controlled hydraulically. During downhill travelling, the displacement of the travel motor can be increased to prevent acceleration. The hydraulic pressure generated by a proportional valve is overdriven by the pressure in the travel motor, i.e. if a certain pressure value in the travel motor is reached the travel motor is swiveled to the maximum displacement independent from the control pressure given over the proportional valve to the travel motor. Depending on an actual driving situation the displacement of the motor and the pump are changed simultaneously.

It is desirable to provide a method to overcome the problem with speed regulating when the work machine is travelling at top speed and starts to accelerate in a downhill drive and to allow for a comfortable and fuel efficient handling of the work machine.

It is also desirable-to provide a travel system which overcomes the problem with speed regulating when the work machine is travelling at top speed and starts to accelerate in a downhill drive and to allow for a comfortable and fuel efficient handling of the work machine.

A method is proposed for operating a hydraulic driven work machine comprising a hydraulic travel motor having a variable displacement, wherein a flow of hydraulic fluid generated by a hydraulic pump is provided to the travel motor and wherein a control valve is provided for controlling the flow of hydraulic fluid from the hydraulic pump to the travel motor in an open loop, closed centre load sensing hydraulic system. The hydraulic pump hydraulically controlled depending on a load signal generated by the travel control valve and the travel motor is electrically controlled according to a desired driving behaviour of the work machine.

Preferably, the work machine is a wheel driven machine, such as an excavator or the like. Generally, the invention is suitable for all machines which have an open loop travel system. With the proposed invention the displacement of the travel motor can be controlled continuously between minimum and maximum values. The behaviour of the machine can be smoothed so that abrupt stops or accelerations can be avoided.

On the other hand, when the machine is going downhill and the actual speed is exceeding an allowed speed, the displacement of the hydraulic motor can be increased thus slowing down the machine until the allowed speed is reached again. The displacement can be adjusted independent of a travel high pressure in the travel motor which is normally the parameter which determines the displacement of the travel motor. The travel motor can be controlled safely at any time. The displacement of the motor is preferably controlled electrically in a direct way by an electric valve integrated in a travel device which includes the travel motor. Further, the travel motor is controlled between the minimum and the maximum displacement continuously and not stepwise, thus allowing for a smooth behaviour of the travel system. Furthermore the stroke of the spool of the travel section in the main control valve (MCV) may be controlled.

Expediently, the displacement of the travel motor can be controlled proportionally between a minimum and a maximum displacement and moreover, and as a result, the travel speed of the machine can be controlled. The travel motor can be swiveled to any needed displacement and not only to fixed displacements.

The displacement of the hydraulic pump may preferably be controlled in a fuel save mode on travel mode. In the fuel saving mode, flow of hydraulic fluid and displacement are adjusted optimally according to a desired driving behaviour, e.g. according to a set speed.

Favourably, a control unit can calculate how the travel motor displacement, a spool stroke in the travel control valve and the displacement of the hydraulic pump have to be changed to get a desired behaviour, e.g. optimized in view of fuel efficiency and/or handling comfort. In addition to the over speed prevention the invention allows for a jerk free reversing between forward and backward travelling, faster acceleration, smoother accelerating and decelerating, and a fuel saving mode.

According to a favourable embodiment of the invention, the displacement of the travel motor may be adjusted independent of an actual travel high pressure in the travel motor by an electrical signal from a travel motor displacement control valve. The pressure in the travel motor does not override a control signal sent to the travel motor.

In conventional systems, the displacement of the travel motor is just depending in the high pressure in the travel motor. Without any pressure (i.e. at stand still), the travel motor is at minimum displacement in such systems. If the machine starts to travel, the pressure will rise and if it is exceeding a certain value, the travel motor is swiveling to its maximum displacement independent of a control pressure provided by a proportional valve to the travel motor. If the pressure falls below this certain value, the travel motor is swiveled to minimum displacement, according to the conventional motor control, which may result in a nervous, abrupt change of movement of the machine.

Advantageously in the present invention, additional parameters besides the travel high pressure can be taken into account for controlling and adjusting the displacement of the travel motor. Expediently, the displacement of the travel motor may be controlled according to a desired behaviour of the travel motor. The displacement of the travel motor may be advantageously changed to a displacement in the range from maximum displacement to minimum displacement depending at least on a travel high pressure and a travel speed of the machine, for instance.

According to another favourable embodiment of the invention, the flow of hydraulic fluid in at least one pilot pressure line of the travel control valve is generated selectively by different devices depending on a selected control state of the work machine. For instance, a pilot pressure can be generated by the travel actuator or by an independent travel flow valve controlled by the control unit which pilot pressure generating devices can be selected as required.

According to another favourable embodiment of the invention, an electrically controlled valve may select between the flows of hydraulic fluid generated by the different pilot-pressure generating devices depending on a selected control state of the work machine.

The electrically controlled valve may be a solenoid valve which may switch between the different sources of pilot pressure. Particularly, the flow of hydraulic fluid in the at least one pilot pressure line of the travel control valve in a first control state may be generated by a travel actuator and in a second control state may be generated by an independent travel flow valve. Advantageously, the electrically controlled valve (e.g. a solenoid valve) interrupts the connection between the travel actuator and the travel control valve while an independent travel flow valve is connected to the travel control valve instead. A drive control valve can be arranged upstream of the travel control valve and the connection between the travel actuator and the travel direction valve may be interrupted, thus interrupting the connection between the travel actuator and the travel control valve.

In the operational travel mode the machine may be for instance driving downhill, accelerating, driving on flat ground, driving, uphill.

There are two different operational modes which are of interest: a work mode and a travel mode of the work machine. In the work mode the electrically controlled valve for switching between the travel actuator and the independent travel flow valve is activated and switches to the independent travel flow valve so that the signal from the independent travel flow valve is sent to the travel section of the main control valve. In the travel mode the electrically controlled valve is activated to have a smoother starting/stopping/reversing behaviour. If the work machine is driving with constant speed it can be selected either to get the pilot pressure from the travel actuator or from the independent travel flow valve. In this case it has only to be ensured that the maximum control (pilot) pressure (e.g. in the range of 35 bar) is provided to the travel spool to have the maximum stroke of the spool.

In both modes, e.g. the work mode and the travel mode, the signal to the pilot pressure lines can be generated either from the travel actuator (in a control state called first control state) or the independent travel flow valve, i.e. the independent travel flow valve (in a control state called second control state).

According, to another favourable embodiment of the invention, the displacement of the travel motor may be adjustable continuously to displacements between a maximum displacement and a minimum displacement proportional to an electric current control signal of a travel motor displacement control valve. Preferably, the travel motor is set to its maximum displacement without any current on the travel motor displacement control valve, particularly at stand still of the machine.

According to another favourable embodiment of the invention, during downhill driving the displacement of the travel motor may be set to a larger displacement when the machine exceeds its maximum allowed speed. The displacement is increased from minimum displacement to a bigger displacement depending on the decline. During uphill driving the travel motor may be shifted to a bigger displacement when a defined, value for a travel high pressure is exceeded. When the machine is going downhill and the speed is just exceeding the allowed speed, the travel motor is swiveled to a bigger displacement to slow down the machine until the allowed, machine speed is reached again and thus over speeding is avoided. The displacement of the travel motor is increased directly if the machine speed exceeds the allowed speed. Control of the travel motor is fast and reliable.

To improve the acceleration of the machine especially from standstill the displacement of the travel motor may be controlled depending on the high pressure in the travel motor and the travel speed. A displacement curve can be selected in the control unit which improves the acceleration. The displacement of the travel motor can follow the selected displacement curve by expedient parameters sent to the respective components by the control unit, e.g. sent to the independent travel flow valve which generates an optimized pilot pressure for the travel control valve instead of the travel actuator.

By reducing the flow of hydraulic fluid as well as the hydraulic losses, the fuel efficiency of the machine may be improved while travelling and working. The losses are reduced by reducing the flow of hydraulic, fluid. At the same step the pressure will rise because the needed power stays the same. One option is to reduce the speed of the prime mover, i.e. the diesel engine speed, to save fuel directly via the prime mover. The second option (which can be combined with the first option) is to reduce hydraulic losses in the travel system as mentioned above. This can be done mainly by reducing the flow of hydraulic fluid to the travel motor and/or by reducing the flow of hydraulic fluid on the other side, i.e. the hydraulic, pump side. The flow is reduced either by the pump directly in the travel mode or by the travel section of the main control valve in combination with the independent travel flow valve in the work mode. The reduction of the flow of hydraulic fluid may be done either by reducing the stroke of a spool in the travel system in the main control valve (the travel control valve is a part of the main control valve) or by reducing the flow of hydraulic, fluid provided by the hydraulic pump.

According to another favourable embodiment of the invention, in a travel mode of the machine a speed of the prime mover may be set to a predetermined fuel economic speed and/or that the pressure in the travel motor may be increased by reducing the flow of hydraulic fluid from the hydraulic pump.

According to another favourable embodiment of the invention, a pressure difference between a pump side and a load side of the control valve may be reduced for reducing the flow of hydraulic fluid applied, to the travel motor.

Hydraulic losses can be reduced in the hydraulic system.

Additionally or alternatively, for reducing a flow of hydraulic fluid to the travel motor, a pilot pressure in the travel pilot lines can be reduced by establishing a desired pilot pressure with an alternative device to the travel actuator, e.g. by a independent travel flow valve. Hydraulic losses can be reduced in the hydraulic system.

Additionally or alternatively, for reducing hydraulic compensation losses in the travel control valve during work mode of the machine, a travel high pressure may be set to an average pressure value corresponding to the average pressure level in high pressure components in the hydraulic, system by reducing the flow of hydraulic fluid going to the travel motor. Hydraulic compensation losses in the hydraulic system can be reduced.

According to another favourable embodiment of the invention, in a work mode of the machine the displacement of the travel motor may be decreased parallel to the reduction of the flow of hydraulic fluid to the travel motor. When the flow of hydraulic fluid to the travel motor is reduced, the displacement of the travel motor may be decreased at the same time to keep the machine speed.

According to a further aspect of the invention, a travel system for operating a work machine is proposed, comprising a hydraulic pump driven by a prime mover, and a hydraulic travel motor having a variable displacement and being drivable by a hydraulic fluid supplied from the hydraulic pump, having an open loop, closed centre load sending hydraulic system. The travel motor is provided with a travel motor control valve which is controlled electrically and the hydraulic pump is provided with a hydraulic pump controller controlling the hydraulic pump depending on a load signal generated by the travel control valve. Advantageously, the proposed system is an open loop, closed centre load sensing system with flow sharing. "Flow sharing" means that the flow is shared between all active functions but only if the flow which is needed is bigger than the maximum pump flow.

According to another favourable embodiment of the invention, a valve may be provided for connecting operationally the control valve alternately either to a pilot-pressure generating travel actuator or to a pilot-pressure generating independent travel flow valve. This allows to disconnect the travel actuator from the travel control valve.

The independent travel flow valve controls the travel section of the maw control valve. The travel motor is controlled by the travel motor displacement control valve so that the displacement of the travel motor can be changed to any desired displacement.

According to a favourable embodiment of the invention, the hydraulic pump controller may include a pressure reduction valve. The pressure reduction valve allows for reducing the flow of hydraulic fluid thus reducing hydraulic losses in the travel system.

Further, a computer program comprising a computer program code adapted to perform a method or for use in the inventive method described above when said program is run on a programmable microcomputer. Particularly, the computer program may be adapted to be downloadable to a control unit or one of its components when run on a computer which is connected to the internet.

Still further, a computer program product stored on a computer readable medium is proposed, comprising a program code for use in the inventive method on a computer. The computer program and the computer program product may be implemented in the control unit of the travel system.

Further, a vehicle is proposed, particularly comprising at least one of an electro-hydraulic control system including at least one joystick and/or pedal and/or main control valve communicating with a control unit via electric signals. In general, the inventive method and system can be applied to a machine which has an electro-hydraulic control system where the joysticks and pedals and not only the travel actuator are not hydraulic anymore and give instead an electric signal to the respective control unit. In addition, the main control valve may also be controlled electrically.

BRIEF DESCRIPTION OF THE DRAWINGS

The present invention together with the above-mentioned and other objects and advantages may best be understood from the following detailed description of the embodiment, but not restricted to the embodiment, wherein is shown schematically.

DETAILED DESCRIPTION

Figure 1:
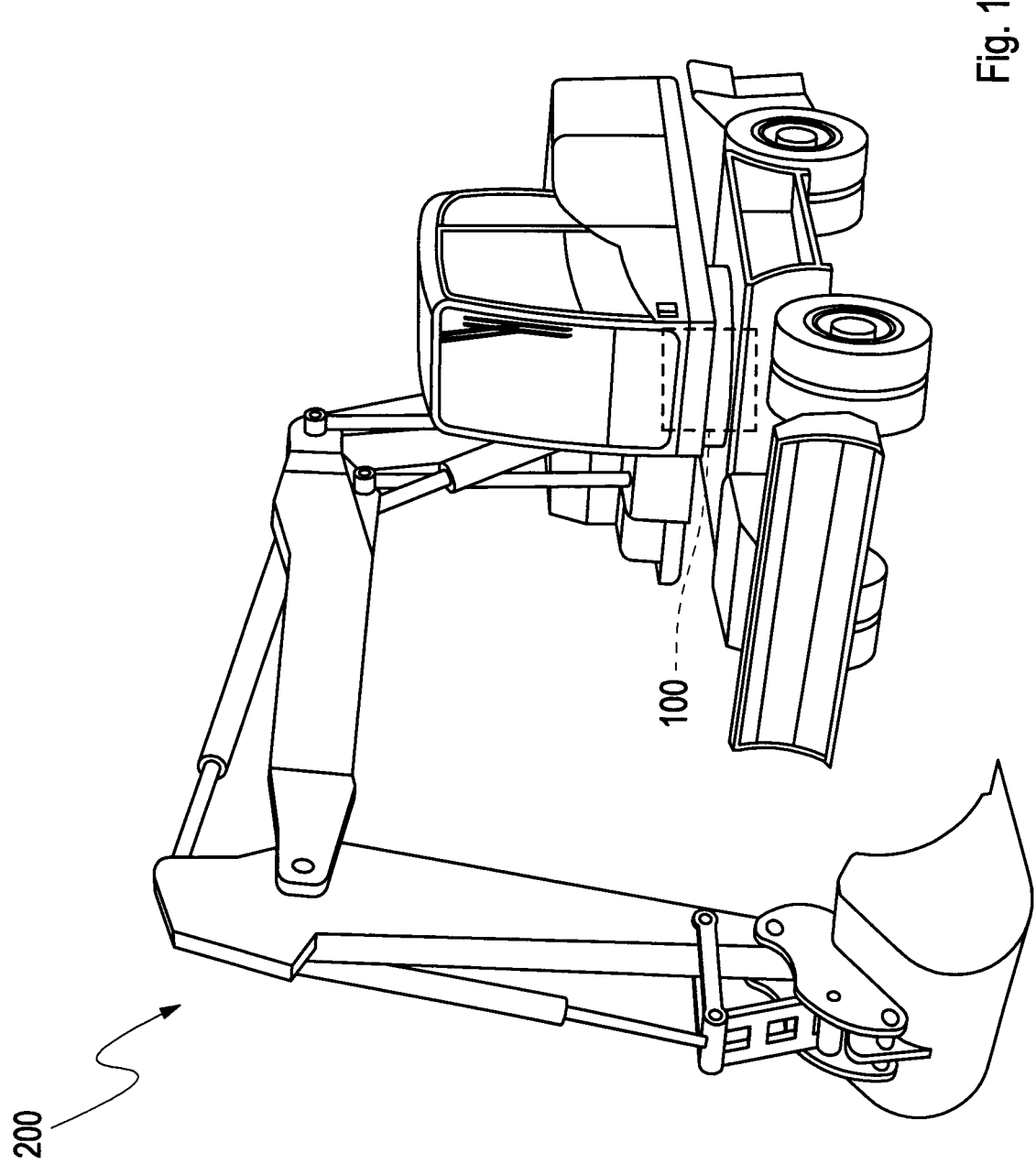
FIG. 1 an example embodiment of a work machine having a hydraulic circuit according to the invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

The invention can be applied in a hydraulic transmission system of a construction machine. The invention is particularly useful for an open loop hydraulic system.

Figure 2A:
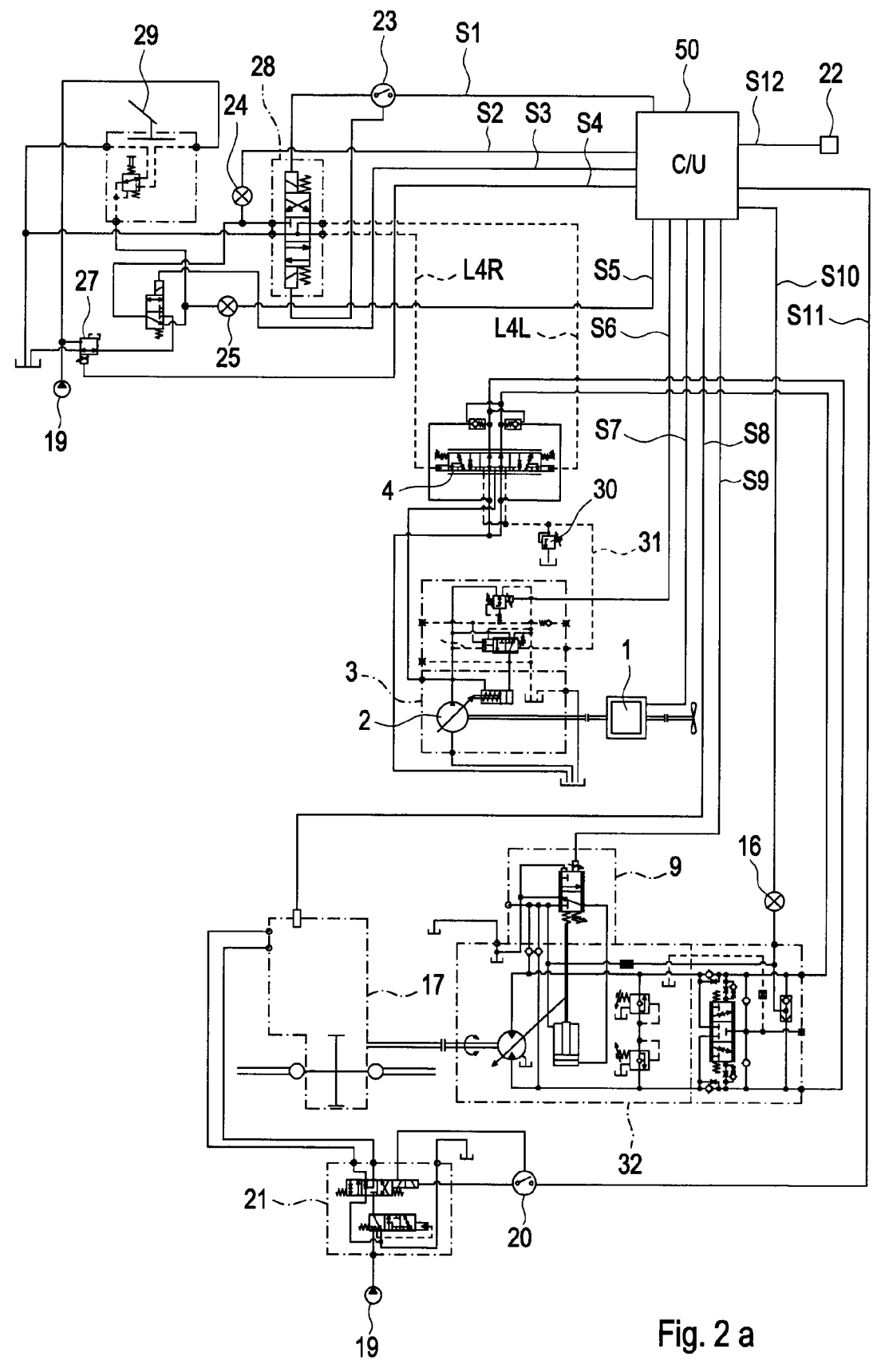
Figure 2:
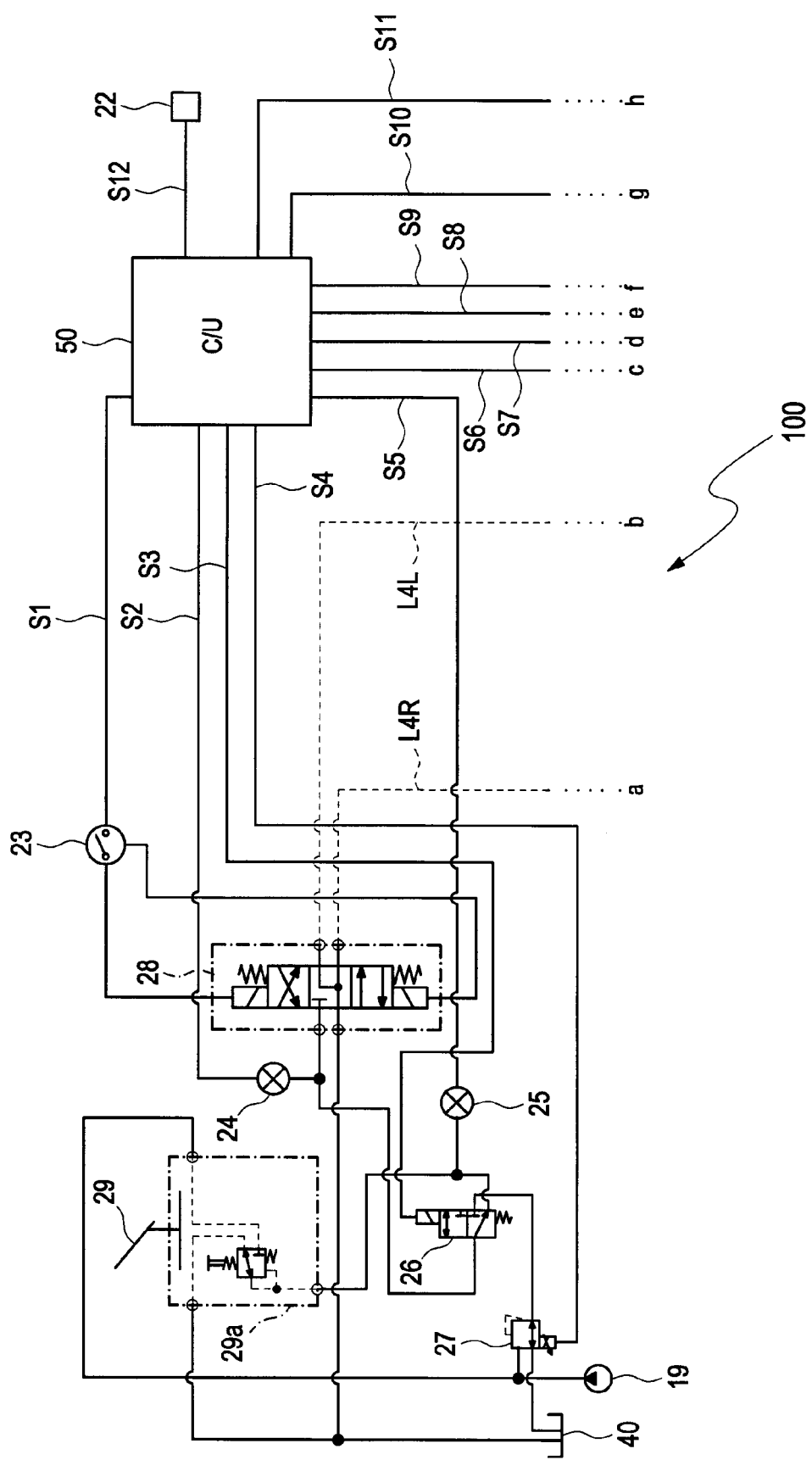
FIG. 2a-2d an example embodiment of several sub-elements of a hydraulic circuit of a travel system of a construction machine according to the invention in an overview (FIG. 2a) and details of the particular portions of the hydraulic circuit (FIGS. 2b-2d)
Figure 2:
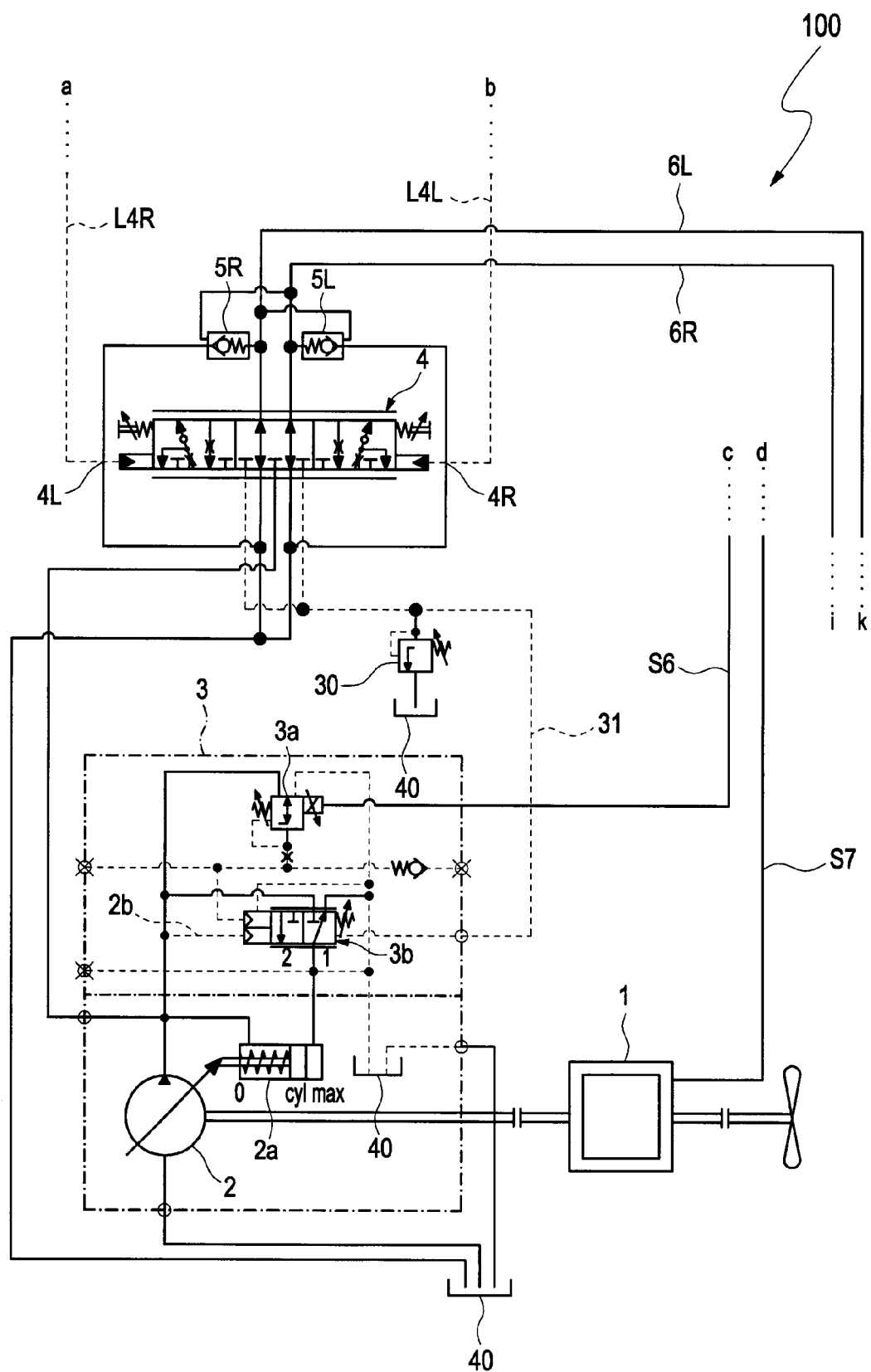
Figure 2D:
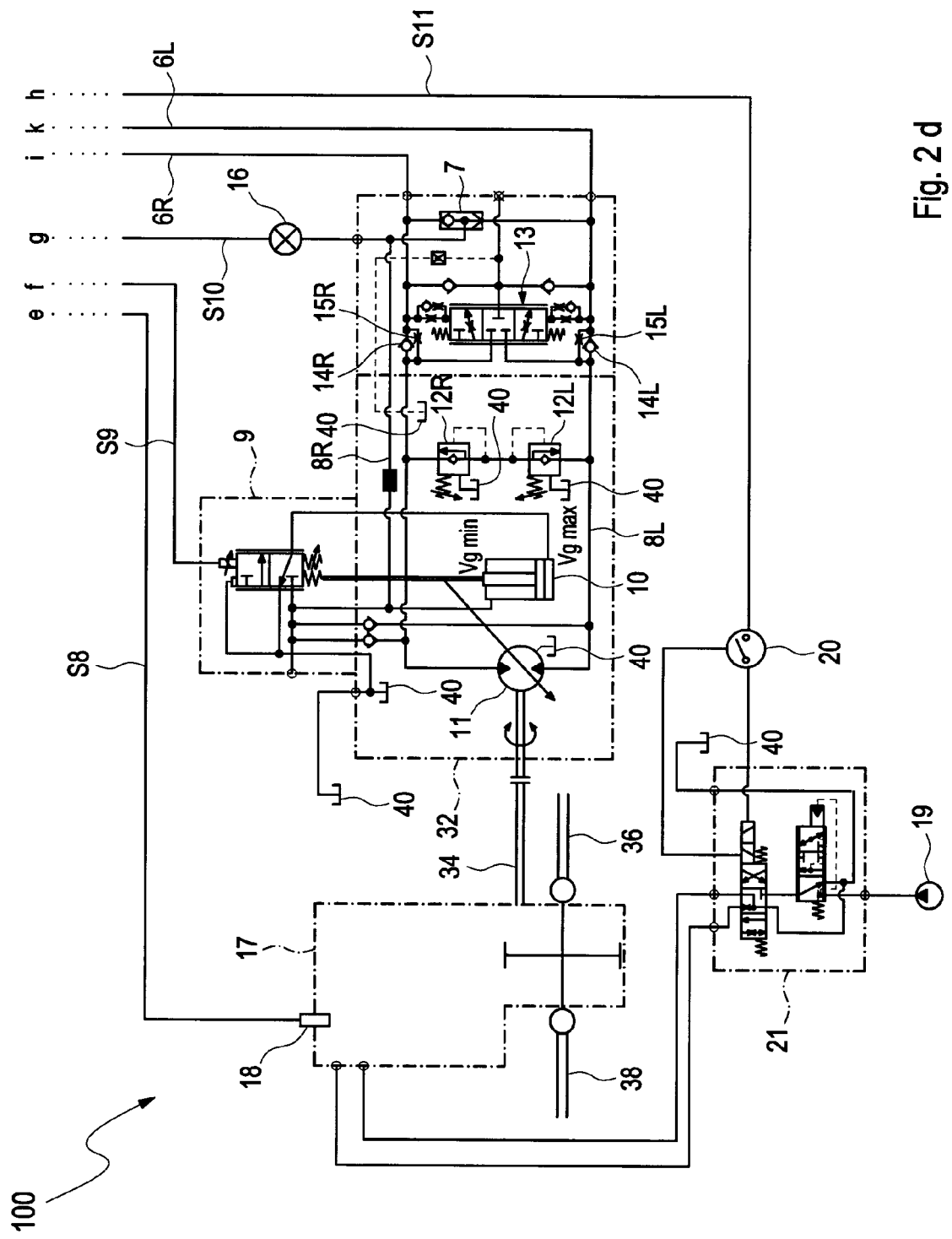

FIG. 1 depicts schematically a vehicle 200 such as a work machine (further on describes as machine 200) equipped with a hydraulic travel system 100 which is described in more detail in FIGS. 2a-2d. For clarity reasons, FIG. 2a depicts an overview of the hydraulic circuit while different portions of the travel system 100 are shown in FIGS. 2b, 2c and 2d and the whole travel system 00 is composed of the portions depicted there. For clarity reasons, the hydraulic or data lines which connect the partial FIGS. 2b, 2c, 2d are labelled with single alphabetic characters a, b, c, . . . to indicate where the respective lines in the drawings continue.

The travel system 100 comprises components for driving a travel motor. A hydraulic pump 2 and a diesel engine as prime mover 1 which is driving the hydraulic pump 2 are coupled to the travel system. The hydraulic pump 2 may also supply hydraulic fluid to other components of the work machine 200 such as aggregates, tools and/or attachments (not shown).

The hydraulic pump 2 generates a flow of hydraulic fluid (typically hydraulic oil) to a spool of a main control valve (only a portion of the valve is shown as travel control valve 4). The main control valve typically includes more spools for supplying flows of hydraulic fluid to various components of the machine 200 such as aggregates, tools and/or attachments (not shown). Only the travel section of the main control valve is shown in the Figure, this travel section of the main control valve is labelled in the following as travel control valve 4.

Without any pilot pressure on (or pressure difference between) travel pilot lines 4L and 4R the spool of the travel control valve 4 is in neutral position where the supply from the hydraulic pump 2 to the travel system 100 is closed. According to this, the hydraulic system of the travel system 100 is a closed centre system.

If the operator of the machine 200 wants to travel, the operator has to operate a travel actuator 29 to generate a hydraulic pilot pressure which is supplied to one of the pilot pressure lines 4L or 4R of the travel control valve 4. The travel actuator 29 includes a hydraulic section 29a. The travel actuator 29 can be e.g. a travel pedal, a joystick, a slider or the like. The hydraulic pilot pressure is going to a solenoid valve 26, i.e. an electrically controlled valve which adapts its state according to an electrical control current supplied to the solenoid of the valve 26, which in neutral position sends the hydraulic pilot pressure generated by the travel actuator 29 to the travel control valve 4 via a travel direction valve 28. In neutral position means that there is no electric current supplied to the solenoid valve 26.

The travel direction valve 28 establishes the travel direction of the machine 200, i.e. forward or backward, depending on the activation of a travel direction actuator 23 (e.g. a switch) by the operator of the machine 200. The travel direction actuator 23 may have three positions: forward, backward and neutral (standing still). The travel direction valve 28 sends the hydraulic pilot pressure generated by the travel actuator 29 either to the travel pilot line 4L or to the travel pilot line 4R, depending on the selected travel direction (i.e. forward L or backward R). This pilot pressure is moving the spool of the travel control valve 4 into the selected direction. The flow of hydraulic fluid generated by the hydraulic pump 2 is sent over work line 6L or work line 6R (depending, on the selected direction) to a travel device 32. Each work line 6L, 6R has a refilling valve 5L, 5R. The travel device 32 comprises a variable displacement travel motor 11, a travel motor displacement control valve 9 connected to a travel motor displacement control spool 10, pressure relief valves 12L, 12R a brake valve 13 and a shuttle valve 7. The shuttle valve 7 selects the higher of the both pressures in line 6R or 6L and sends the pressure signal to the high pressure sensor 16. Hydraulic pressure is supplied to the travel motor 11 in the travel device 32 by pressure lines 8L, 8R which are connected to the work lines 6L, 6R coming from the travel control valve 4 external of the travel device 32.

At the same time, a load pressure of the travel device 32 is sent over a load sensing line 31 (sensing a load signal LS) to a pump controller 3 and, in particular, to an LS control valve 3b. A cut of valve 30 is arranged in the load sensing line 31. The cut of valve 30 limits the load signal LS pressure in the system and by this the maximum system pressure. When the machine 200 is started and there is no load signal LS from the travel control valve 4 the hydraulic pump 2 is at its minimum displacement and only providing a stand-by flow of hydraulic fluid to cover leakages in the hydraulic system of the machine 200. The LS control valve 3b (having positions 1 and 2) is in this case in position 2 because the hydraulic pressure (work pressure) generated by the hydraulic pump 2 is sent over a signal line 2b to the LS control valve 3b and is moving the spool of the LS control valve 3b from position 1 to position 2. The LS control valve 3b is sending the hydraulic pressure generated by the hydraulic pump 2 to a swivel angle control valve 2a having positions between two end positions 0 and CYL_MAX. Between these end positions all other positions are possible.

The hydraulic pressure is moving the spool of the swivel angle control valve 2a from its maximum swivel angle position CYL_MAX to position 0 which is the minimum swivel angle of the hydraulic pump 2. The valve 3b moved from 2 to 1 only if there is a load signal LS from the travel control valve 4 is sent to the LS control valve 3b over the LS signal line 31, the LS control valve 3b is moved from position 2 to position 1 and the pressure in the chamber of the swivel angle control valve 2a is drained to tank 40. The spool of swivel angle control valve 2a is then moving from position 0 to position CYL_MAX and the hydraulic pump 2 is providing more flow of hydraulic fluid to the travel system 100, i.e. to the travel control valve 4 and the travel motor 11. This flow of hydraulic fluid is going over the work lines 6L or 6R (depending on the selected direction) to the travel device 32 and hence the travel motor 11.

The travel device 32 includes the travel motor 11, travel displacement control spool 10 (motor regulator) which changes the displacement of the travel motor 10 and a travel displacement control valve 9 which is controlled electrically.

In the travel device 32 the flow of hydraulic fluid is going over check valves 14L or 14R to the travel motor 11 which as a result is starting to turn. The travel motor 11 is connected to a travel gear box 17 via a shaft 34 which is driving, in this example, wheels of the machine 200 over two propel shafts 36, 38 and two axles (not shown). The hydraulic fluid returning from the travel motor 11 is going over a brake valve 13 in the travel device 32 and the work line 6L or 6R (depending on the selected direction) to the travel control valve 4 and from the travel control valve 4 to the tank 40.

The spool of the brake valve 13 is moving and opens a connection to the work lines 6L and 6R so that the returning flow of hydraulic fluid from the travel motor 11 can return to the travel control valve 4. In the neutral position, all ports of the brake valve 13 are closed and there is only a connection over orifices 15R and 15L from the travel motor 11 to the work lines 6L and 6R.

The electric control circuit of the travel system 00 shown in FIGS. 2a-2d comprises a travel high pressure sensor 16, a travel speed sensor 18, a travel/work selector switch 22, a travel actuator pressure sensor 25, a travel pilot pressure sensor 24, the travel direction switch 23, the travel direction valve 28, a gear selector switch 20, an independent travel flow valve 27, the solenoid valve 26, a travel motor displacement control valve 9, a LS pressure reduction valve 3a and a control unit 50. The control unit 50 has input and output signal lines S1-S12 which may work unidirectional or bidirectional.

The input signals of the control unit 50 are provided via signal lines by the travel high pressure sensor 16 (signal line S10), the travel speed sensor 18 (signal line S8), the travel/work selector switch 22 (signal line S12), the travel actuator pressure sensor 25 (signal line S5), the travel pilot pressure sensor 24 (signal line S2), the travel direction switch 23 (signal line S1), the gear selector switch 20 (signal line S11).

The output signals of the control unit 50 are the signals over signal lines to the travel motor displacement control valve 9 (signal line S9), the LS pressure reduction valve 3a (signal line S6), the travel direction valve 28 (signal line S1), the solenoid valve 26 (signal line S3), and the independent travel flow valve 27 (signal line S4).

The prime mover 1 is connected to the control unit 50 via signal line S7.

With the LS pressure reduction valve 3a, the pressure loss LS_AP over the travel control valve 4 can be reduced and thereby the flow of hydraulic fluid going to the spool of the travel control valve 4 and hence to the travel motor 11.

An alternate possibility to reduce the flow of hydraulic fluid going to the travel motor 11 is to decrease the pilot pressure in the travel pilot lines 4L, 4R with the independent travel flow valve 27 and the solenoid valve 26. The independent travel flow valve 27 generates the desired pilot pressure and the solenoid valve 26 selects if either the pilot pressure generated by the independent travel flow valve 27 or the pilot pressure generated by the travel actuator 29 is sent to the spool of the travel control valve 4 via the travel direction valve 28.

In other words, the solenoid valve 26 controls the stroke of the spool of the travel control valve 4 independently from the hydraulic pilot pressure generated by the travel actuator 29.

These two functionalities for reduction of the flow of hydraulic fluid are considered for fuel efficiency improvement due to the fact that the flow of hydraulic fluid is reduced and thereby losses generated by the flow of hydraulic fluid. An important output signal of the control unit 50 in this context is the signal to the travel motor displacement control valve 9. With this travel motor displacement control valve 9 the displacement of the travel motor 11 can be controlled proportionally to the electric current to the valves solenoid from maximum displacement to minimum (zero) displacement. Without any current on the travel motor displacement control valve 9 the travel, motor 11 is at maximum displacement. Depending on the input signals the displacement of the travel motor 11 is controlled in a way that the machine 200 does not over speed and has a good and smooth control behaviour, a good acceleration, a soft start and stop behaviour and a good fuel efficiency. For such a control, the control unit 50 may include control parameters for a desired drive behaviour of the machine 200.

In the following passages, the procedures for driving on flat ground, driving downhill and driving uphill are discussed.

When the machine 200 is standing still, the travel motor 11 is at its maximum displacement to have the highest possible torque in order to hold the machine 200 in its position. On flat ground, when the operator wants to travel, the operator operates the travel actuator 29, thus generating a hydraulic pilot pressure in a hydraulic fluid coming from a pilot gear pump 19, the pilot pressure depending on the stroke of the travel actuator 29. The pilot gear pump 19 is connected via a gear shift valve 21 to the travel gear box 17. A gear selector switch 20 is operationally connected with the gear shift valve 21 and connected via, signal line S11 to the control unit 50.

The generated pilot pressure is detected by the travel actuator pressure sensor 25 and the respective signal sent to the control unit 50. The spool of the travel control valve 4 is moved and the flow of hydraulic fluid coming from the hydraulic pump 2 is sent to the travel motor 11 in the travel device 32. The travel motor 11 starts to turn and the machine 200 starts to drive. Depending on a travel high pressure, detected by the travel high pressure sensor 16, and a travel speed of the machine 200, detected by the travel speed sensor 18, the displacement of the travel motor 11 is changed from maximum displacement to minimum displacement over the travel motor displacement control valve 9. This displacement change can be optimized to have the best possible acceleration by respective control parameters provided by the control unit 50.

When the operator wants to stop the machine 200, the operator releases the travel actuator 29. The travel pilot pressure will drop to zero and the spool of the travel control valve 4 is going to neutral position, thus cutting the connection to the hydraulic pump 2. The flow of hydraulic fluid, e.g. oil, to the travel motor 11 is reduced to zero. The control unit 50 may control the displacement of the travel motor 11 in the way that the stopping of the machine 200 is soft and not abrupt.

For driving downhill, the basic control principle is the same as for driving on flat ground. The main difference is that when moving downhill the machine 200 experiences acceleration due to gravity which means that the machine 200 could travel faster downhill than it should. To prevent this over-speeding the machine 200 is expediently slowed down by controlling the displacement of the travel motor 11. If the operator operates the travel actuator 29 at full stroke the machine 200 accelerates until it reaches its maximum allowed speed. Due to gravity and without action of the control unit 50, the machine 200 would accelerate further downhill and reach a speed over the maximum allowed speed. According to the invention, the displacement of the travel motor 11 is increased. Increasing the displacement of the travel motor 11 brakes the travel motor 11. According to this, exceeding the maximum allowed speed can be prevented, i.e. the speed desired by the operator is maintained.

For driving uphill, the basic control principle, is the same as for driving on flat ground. The main difference is that while driving uphill, the travel high pressure is rising because the required torque to move the machine 200 is higher as the machine 200 is decelerated by gravity. If the pressure stays below a defined value, the displacement of the travel motor 11 is not changed. If this defined value for the travel high pressure is exceeded the travel motor 11 is shifted to a bigger displacement by the travel motor displacement control valve 9 to increase the torque of the travel motor 11. Additionally, not only the travel pressure is controlling the displacement of the travel motor 11 in this case but also the speed or the decrease of the speed. These two latter parameters are a main input signals for the uphill travelling. The displacement of the travel motor 11 is controlled over the travel motor displacement control valve 9 by the control unit 50 in the way that on the one hand the maximum possible gradability is secured and on the other hand the machine 200 can drive uphill with the maximum possible speed according to the actual stroke of the travel actuator 29. Normally the operator is driving uphill always with full stroke on the travel actuator 29.

The invention also allows a fuel save mode. The fuel safe mode is only active when the machine 200 is travelling with a constant speed. It is possible to reduce the fuel consumption of the prime mover 1 (i.e. the diesel engine) and to reduce the flow of hydraulic fluid to the travel motor 11 and by this the losses created by the flow of hydraulic fluid.

The fuel save mode can be active in the work mode (w-mode) as well as in the travel mode (t-mode).

In the work mode the operator can operate all functions of the machine 200. The average pressure level in the high pressure components of the hydraulic system is in this case about 150-200 bar. In this case other components additionally to the travel section (travel control valve 4) of the main control valve are active and supplied with hydraulic fluid from the hydraulic pump 2. To have the lowest possible compensation losses in the travel section (i.e. travel control valve 4) included in the main control valve the travel high pressure is set to the average pressure level by reducing the flow of hydraulic fluid going to the travel motor 11. In the work mode this is done with the independent travel flow valve 27 and the solenoid valve 26 as described above. The independent travel flow valve 27 generates the needed hydraulic pilot pressure for the desired position of the spool of the travel control valve 4 to have the required flow of hydraulic fluid to the travel motor 11. The solenoid valve 26 interrupts the connection from the travel actuator 29 to the travel direction valve 28 (and hence to the travel control valve 4) and the independent travel flow valve 27 is connected to the travel direction valve 28 instead (and hence to the travel control valve 4). Now the position of the spool of the travel control valve 4 is independent of the travel actuator pressure and can be controlled by the control unit 50. With the reduced flow of hydraulic fluid the machine 200 would drive slower than before. To keep the machine speed at a desired (higher) value, the displacement of the travel motor 11 may be decreased in parallel to the reduction of the flow of hydraulic fluid. This is done by the control unit 50 sending an appropriate control signal to the travel motor displacement valve 9.

In the travel mode the principle is generally the same. However, with the difference that in the travel mode the operator can only travel with the machine 200 but no other function is active. Because of this fact, the travel high pressure can be higher than in the work mode because there is no pressure compensation. This means that the reduction of the flow of hydraulic fluid can be higher than in the work mode. The reduction of the flow of hydraulic fluid is done first by reducing, the speed of the prime mover 1 to a speed with optimum working point in regard of fuel consumption. If the travel high pressure is still not at the maximum possible pressure, the flow of hydraulic fluid is further reduced by the hydraulic pump 2 directly. The reduction of the flow of hydraulic fluid is done by the LS pressure reduction valve 3a. The LS pressure reduction valve 3a sends a pressure to the LS control valve 3b. The higher the pressure sent to the LS control valve 3b, the lower the pressure loss LS_AP over the travel control valve 4 is. With the reduced pressure loss LS_AP the flow of hydraulic fluid to the travel motor 11 is also reduced.

With the proposed invention the displacement of the travel motor 11 can be controlled proportionally between minimum and maximum values. When the machine 200 is going downhill and the actual speed is exceeding, an allowed speed, the displacement of the hydraulic motor 11 is increased thus slowing down the machine 200 until the allowed speed is reached again. In a fuel saving mode, flow of hydraulic fluid and displacement are adjusted optimally according to a set speed.

For providing a softer start/stop/reversing behaviour the independent travel flow valve 27 is selected as pressure source for the pilot pressure for the travel control valve 4 instead of the travel actuator 29. By this independent travel flow valve 27 the opening and closing of the travel spool of the main control valve 4 can be made smoother. If the operator e.g. starts to travel the operator pushes the travel actuator 29 from 0 to full stroke and thereby the travel spool is also pushed from 0 to full stroke very quickly resulting in a jerky behaviour of the machine 100. With the independent travel flow valve 27 the pressure controlling the travel spool can be build up constantly resulting in a constant increase of the stroke of the travel spool of the main control valve 4 and a smooth acceleration of the machine 100. The same principle can be used for a softer stop and reversing of the machine 100.

Figure 3:
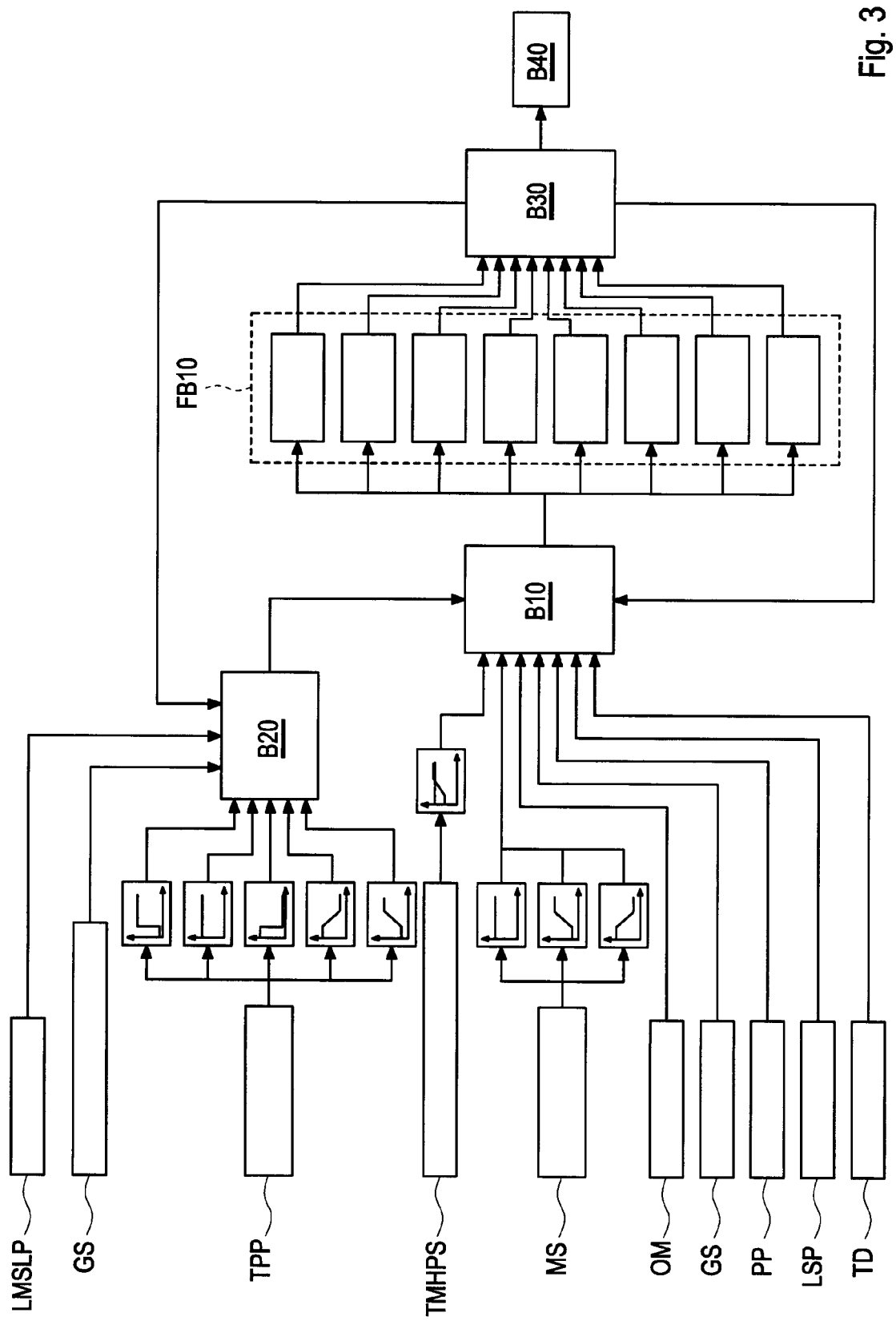
FIG. 3 a block diagram of an electric travel motor function.

FIG. 3 shows a block diagram of an electrical travel motor control performed by way of the travel motor displacement control valve 9 (FIG. 2d). A driving state classification block B10 receives various inputs.

A first set of input is related to parameter blocks providing various parameters such as operation mode OM of the machine (travel mode or work mode), the selected gear GS, pedal pressure PP, LS pressure LSP, travel direction TD (reverse or forward). A further input block MS is related to machine speed where the machine speed is input to subsequent control blocks which describe constant speed, increasing speed and decreasing speed, respectively.

Another input TMHP comes from the travel motor high pressure sensor 16 (FIG. 2d) via a control block which limits the maximum allowed travel motor high pressure. Another input comes from a block B20 related to estimation of requested speed. Block 20 has an input from travel pedal pressure block TPP via control blocks describing a step between zero and full pressure, constant pressure, a step between full and zero pressure, a decreasing pressure and an increasing pressure behaviour. Block 20 further receives input from gear select block GS related to the selected gear, and a parameter from block LMSP related to a legal maximum speed parameter.

Block B10 in which the drive state is classified forwards the result to block B30 related to calculation of the travel motor displacement via a mode function block FB10 as response to the drive state classification. Block 30 also provides an input for B10 as a feed back and to block. B20 related to estimation of the requested speed. The result of the calculation of the travel motor displacement is forwarded from block B30 to block B40 related to travel motor control.

Figure 4:
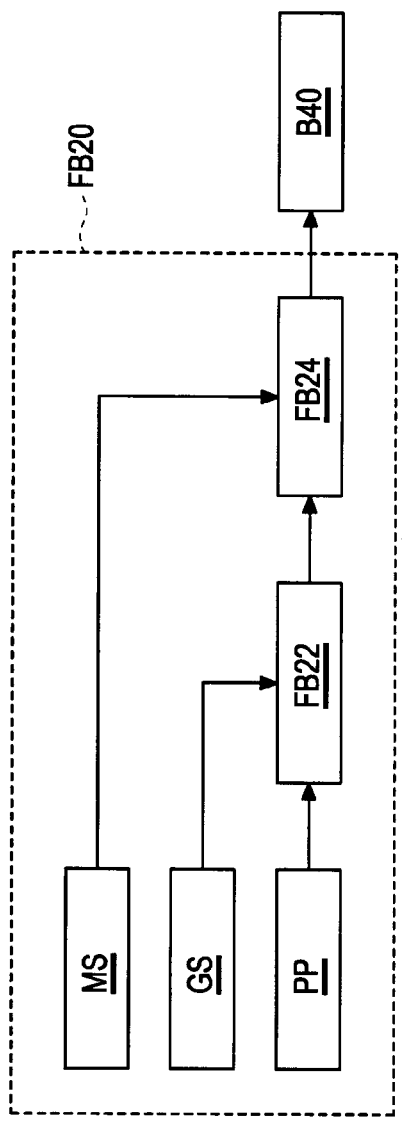
FIG. 4a-4h block diagrams of various functions used as input for calculating, a travel motor displacement.
Figure 4:
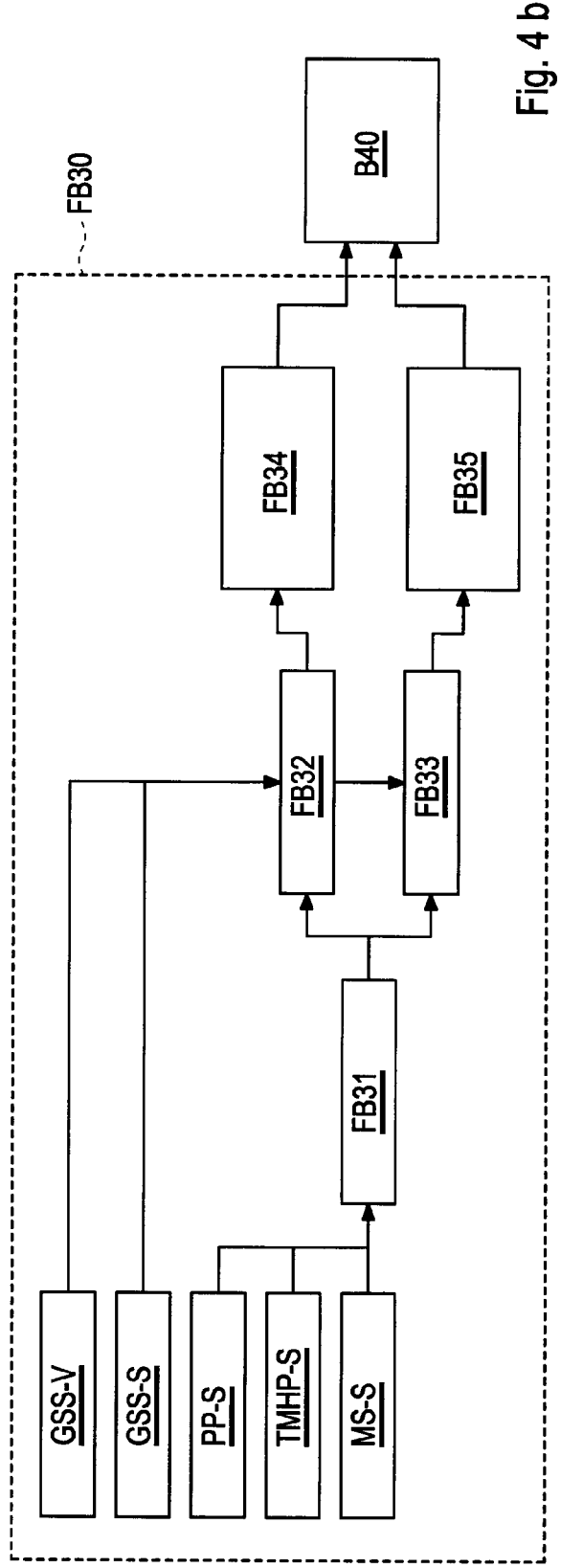
Figure 4:
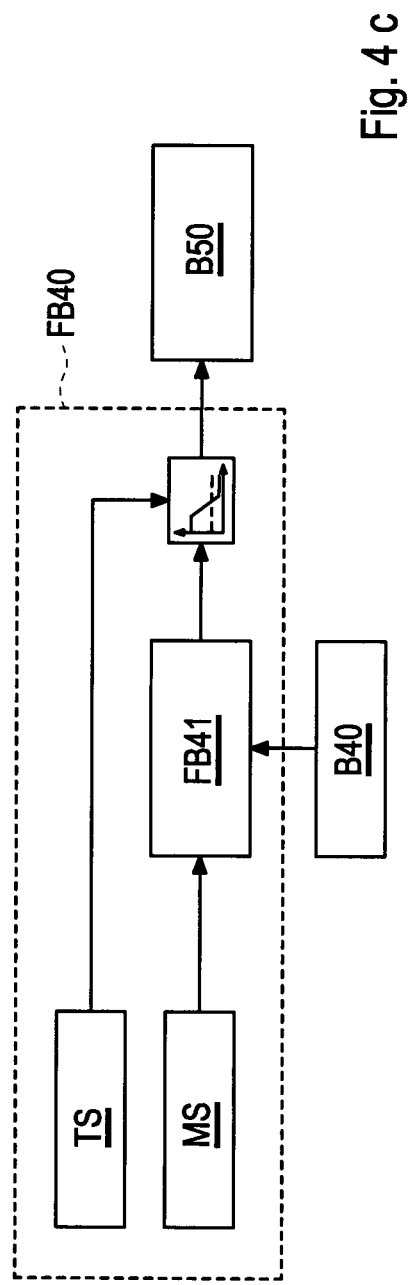
Figure 4:
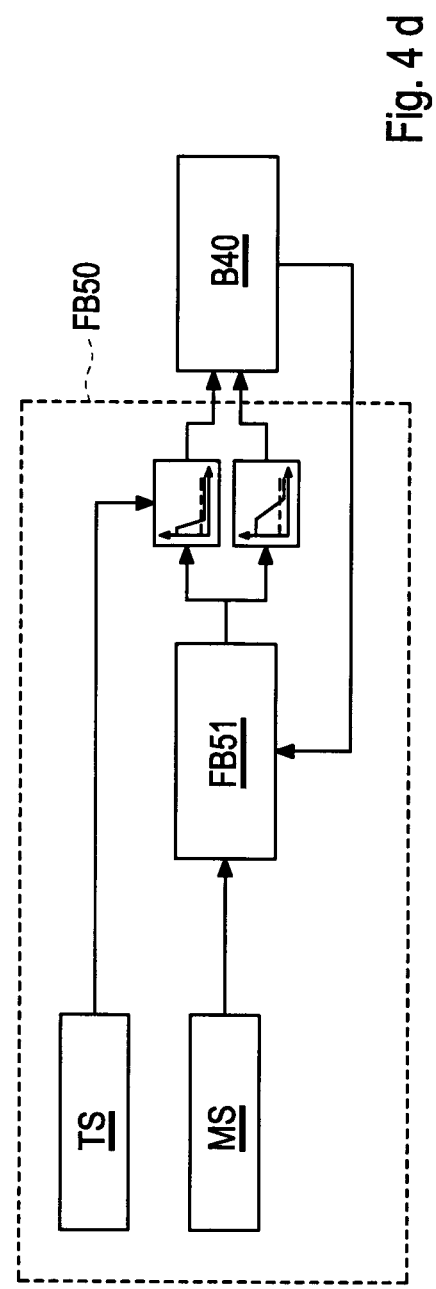
Figure 4:
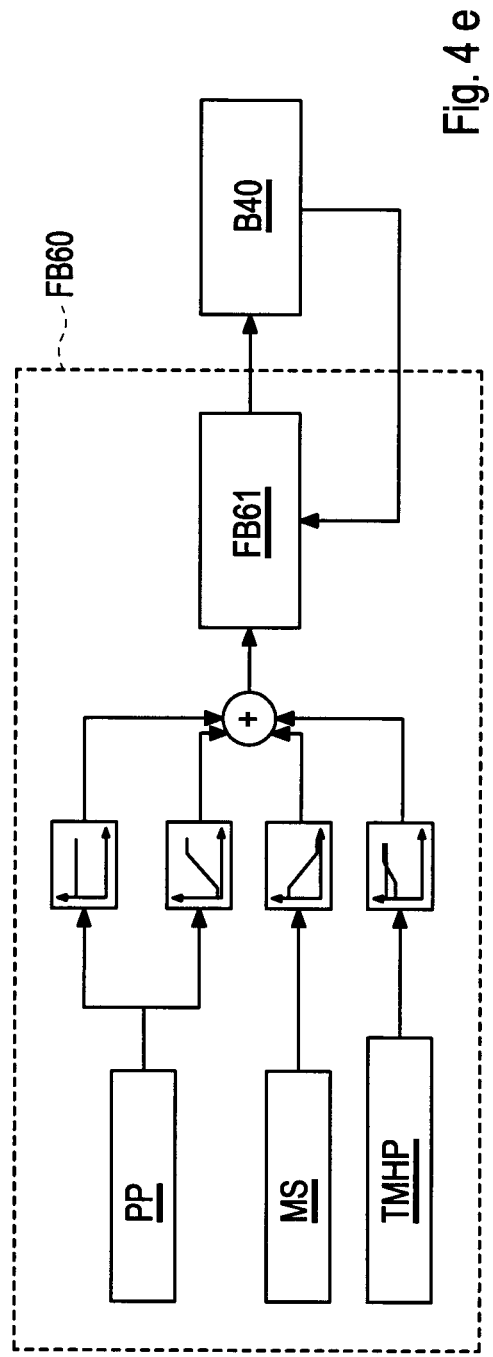
Figure 4:
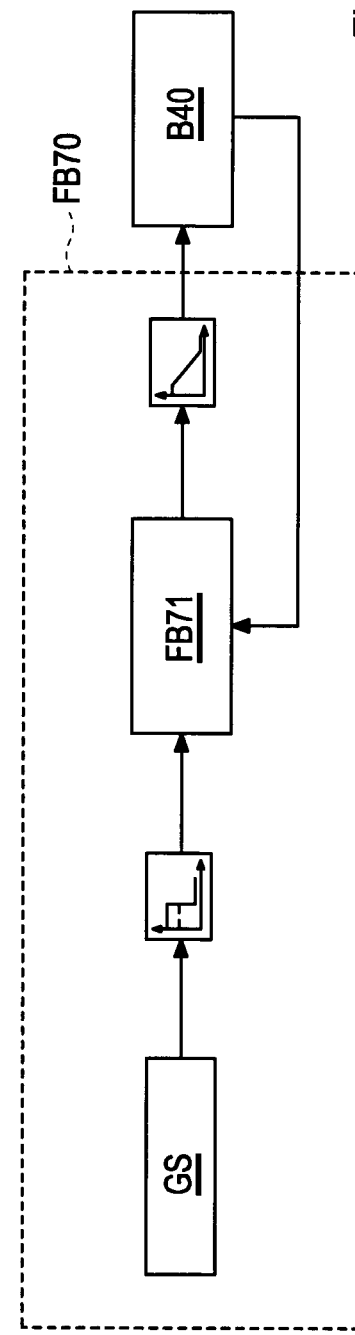

The functions of mode function block FB10 are described in more detail as block diagrams in FIGS. 4a-4h, where the mode function block FB10 includes various function blocks related to such as speed control function (FIG. 4a), safety mode (FIG. 4b), reversing mode (FIG. 4c), stop mode (FIG. 4cd), uphill driving mode (FIG. 4e), gear down shift mode (FIG. 4f), emergency overspeed prevention (FIG. 4g), eco mode (FIG. 4h).

In the speed control function block FB20 in FIG. 4a block FB22 calculates the requested speed depending on parameters pedal pressure PP and selected gear GS and machine speed MS. In subsequent block FB24 a closed loop control is done based on the calculated requested speed from block FB22 and an input of the machine speed MS and the result is forwarded to the travel motor control block B30.

In the safety function block FB30 in FIG. 4b an error evaluation is made in block FB31 based on a machine speed sensor status block MS-S, a travel motor high pressure sensor status block TMHP-S and as pedal pressure sensor status block PP-S, the result of which is forwarded to block FB32 or FB33. The output signal of FB31 is send to blocks FB32 and FB33, in case of "gear 1", "gear 2" or "error" is selected, the signal goes further to block FB34, if "gear 3" is selected, the signal is send to block FB35. Block FB32 is addressed in case an actually selected gear is a lower gear (e.g. first or second gear 1) or an error is detected. Block FB33 is addressed in case a higher gear (e.g. third gear) is actually selected. Blocks FB32 and FB33 also receive input of a gear select switch status block GSS-S and a gear select switch value block GSS-V which are addressed depending on the selected gear.

Block FB32 provides input for block FB34 where the flow of the hydraulic fluid demand is set corresponding to a maximum low speed, e.g. a maximum of 5 km/h which allows use of the machine despite a detected error in the machine speed sensor system, the travel motor high pressure sensor system or the pedal pressure sensor system, for instance. Block FB33 provides input for block FB35 where the flow of the hydraulic fluid demand is set corresponding to a maximum high speed, e.g. a maximum of 20 km/h. Either block FB34 or FB35 forwards the generated fluid related parameters to the travel motor control block B40 which establishes the required machine speed accordingly.

Block FB41 in the reversing function block FB40 illustrated in FIG. 4c provides an increasing flow of hydraulic fluid for a smooth deceleration according to input, from the machine speed block MS as well as from the travel motor control block B40. If a certain speed level, which depends on TS, is reached, the travel direction is changed in B50.

Block FB51 in the stop mode block FB50 illustrated in FIG. 4d provides an increasing flow of hydraulic fluid for a smooth deceleration according to input from the machine speed block MS as well as from the travel motor control block B40. Dependent on gear selection TS, the output of FB51 is forwarded to upper control block for stronger deceleration or to the lower control block for smoother deceleration.

The uphill driving function block FB60 in FIG. 4e has a central function block FB61 for increasing the flow of hydraulic fluid to increase the travel motor torque. Block FB61 receives input from the travel motor control block B40 and a combined input from travel motor high pressure block TMHP, machine speed block MS and pedal pressure block PP via control blocks which describe the behaviour of the pedal pressure (constant or increasing), the behaviour of the machine speed (decreasing) and the travel motor high pressure (increasing up to an upper allowable limit) thus establishing the desired uphill driving behaviour.

FIG. 4f illustrates the gear down shift function block FB70 which decreases the flow of hydraulic fluid for smooth deceleration of the machine. Block FB71 provides input for the travel motor control block B40 via a control block describing the smooth deceleration and receives input of gear select block GS via a control block describing the gear downshift. The travel motor control block B40 feeds back input to block FB71.

FIG. 4*e* illustrates the emergency overspeed function block FB80 provided for preventing overspeed of the machine. Block FB81 provides for a strong decrease of flow of the hydraulic fluid for a fast deceleration of the machine and receives input from machine speed block MS via a control block describing an increasing speed with speed limitation. Travel motor control block B40 receives input from block FB81 and feeds back information to block FB81.

FIG. 4*h* illustrates an eco mode block FB90 for saving fuel. Block FB91 provides for a shift from control via the hydraulic portion 29*a* of travel actuator 29 (FIG. 2*b*) to the (independent) travel flow valve 27 and addresses travel flow shift valve block TFSV (related to solenoid valve 26) and the independent travel flow valve block ITFV (related to valve 27) accordingly. Block FB91 receives input from pedal pressure block PP, gear select block GS, operation mode block OM, machine speed block MS and navel motor high pressure block TMHP via eco mode preconditions block FB92. Block 92 provides input for block FB94 for calculation of the number of rotation of the diesel engine which drives the hydraulic pump and the result is forwarded to engine block B60.

Further, block FB91 addresses maximum pilot pressure block FB93 which receives input from travel pilot pressure sensor block TPiP and travel pedal pressure sensor block TPP. Block FB93 addresses block FB95 in which calculation of the pump flow is performed wherein block FB95 provides input for anti stall control block B50. Further block FB93 addresses block FB96 in which the travel motor displacement is calculated which is handed over to travel motor control block B40.

Advantageously, the invention allows improvement of the overall controllability of the travel system. The starting and stopping behaviour of the machine is softer as well as the driving comfort itself is improved so that the machine is behaving smooth and not nervous. This is mainly achieved by the control of the displacement of the travel motor but also by optimizing the curve of the travel actuator, e.g. a travel pedal or the like, and the main control valve due to the control of the control unit.

The invention claimed is:

1. A method for operating a hydraulic driven work machine comprising a hydraulic travel motor having a variable displacement, wherein a flow of hydraulic fluid generated by a hydraulic pump is provided to the travel motor and wherein a control valve is provided for controlling the flow of hydraulic fluid from the hydraulic pump to the travel motor in an open loop, closed center load sensing hydraulic system, wherein the hydraulic pump is hydraulically controlled depending on a load signal generated by the travel control valve and the travel motor is electrically controlled according to a desired driving behavior of the work machine, wherein the displacement of the travel motor is continuously adjustable between a maximum displacement and a minimum displacement, and adjustability of the travel motor's displacement is independent of an actual pressure in the travel motor.

2. The method according to claim 1, wherein the displacement of the travel motor is adjusted by an electrically controlled travel motor displacement control valve.

3. The method according to claim 1, wherein at least one of (a) in a travel mode of downhill driving the displacement of the travel motor is increased to a larger displacement when the machine exceeds its maximum allowed speed and (b) in an operational mode of uphill driving the travel motor is shifted to a bigger displacement when a defined value for a travel high pressure is exceeded, and (c) wherein a speed decrease exceeds a defined maximum value.

4. The method according to claim 1, wherein a pressure difference between a pump side and a load side of the travel control valve is reduced for reducing the flow of hydraulic fluid applied to the travel motor.

5. The method according to claim 1, wherein a pilot pressure in travel pilot lines is reduced for reducing the flow of hydraulic fluid applied to the travel motor.

6. The method according to claim 5, wherein in a work mode of the machine the displacement of the travel motor is decreased parallel to the reduction of the flow of hydraulic fluid to the travel motor.

7. The method according to claim 1, wherein a pressure difference between pump side and load side of the control valve is adjusted to a preset value.

8. The method according to claim 1, wherein at least one of (a) in a travel mode of the machine a speed of the prime mover is set to a predetermined fuel economic speed and (b) the pressure in the travel motor is increased by reducing the flow of hydraulic fluid from the hydraulic pump.

9. The method according to claim 1, wherein, when driving on a flat ground in the travel mode, when the travel actuator is activated, thus generating a hydraulic pilot pressure in a hydraulic fluid depending on the stroke of the travel actuator and moving the spool of the travel control valve thus sending the flow of hydraulic fluid to the travel motor, the displacement of the travel motor is changed to a displacement between maximum and minimum displacement depending on a travel high pressure and a travel speed of the machine.

10. Microcomputer comprising a computer program comprising a computer program code on a non-transitory computer readable medium adapted to perform a method or for use in a method according to claim 1.

11. Computer comprising a computer program comprising a computer program code on a non-transitory computer readable medium adapted to perform a method or for use in a method according to claim 1 adapted to be downloadable to a control unit or one of its components.

12. Computer program product stored on a non-transitory computer readable medium, comprising a program code for use in a method according to claim 1.

13. A method for operating a hydraulic driven work machine comprising a hydraulic travel motor having a variable displacement, wherein a flow of hydraulic fluid generated by a hydraulic pump is provided to the travel motor and wherein a control valve is provided for controlling the flow of hydraulic fluid from the hydraulic pump to the travel motor in an open loop, closed centre load sensing hydraulic system, wherein the hydraulic pump is hydraulically controlled depending on a load signal generated by the travel control valve and the travel motor is electrically controlled according to a desired driving behaviour of the work machine, wherein the flow of hydraulic fluid in at least one pilot pressure line of the travel control valve is selectively generated by an independent travel flow valve or a travel actuator depending on a selected control state of the work machine, the flow of hydraulic fluid in the at least one pilot pressure line of the travel control valve in a first control state is generated by a travel actuator and in a second control state is generated by an independent travel flow valve.

14. The method according to claim 13, wherein an electrically controlled valve selects between the flow of hydraulic fluid generated by the independent travel flow valve or generated by the travel actuator depending on the selected control state of the work machine.

15. A travel system for operating a work machine having an open loop, closed center load sensing hydraulic system, the work machine comprising a hydraulic pump driven by a prime mover, and a hydraulic travel motor having a variable displacement and being drivable by a hydraulic fluid supplied from the hydraulic pump, wherein the travel motor is provided with a travel motor control valve which is electrically controlled and the hydraulic pump is provided with a hydraulic pump controller controlling the hydraulic pump depending on a load signal generated by a travel control valve, wherein the displacement of the travel motor is continuously adjustable between a maximum displacement and a minimum displacement, and adjustability of the travel motor's displacement is independent of an actual pressure in the travel motor.

16. The system according to claim 15, wherein the hydraulic pump controller includes a pressure reduction valve.

17. A vehicle comprising a travel system according to claim 15.

18. The vehicle according to claim 17, comprising at least one of an electro-hydraulic control system including at least one if joystick, a pedal, and a main control valve communicating with a control unit via electric signals.

19. A travel system for operating a work machine having an open loop, closed center load sensing hydraulic system, the work machine comprising a hydraulic pump driven by a prime mover, and a hydraulic travel motor having a variable displacement and being drivable by a hydraulic fluid supplied from the hydraulic pump, wherein the travel motor is provided with a travel motor control valve which is electrically controlled and the hydraulic pump is provided with a hydraulic pump controller controlling the hydraulic pump depending on a load signal generated by a travel control valve, wherein a valve is provided for operationally connecting pilot lines of the travel control valve alternately either to a pilot-pressure generating travel actuator or to a pilot-pressure generating independent travel flow valve depending on a selected control state of the work machine.

* * * * *